United States Patent
Garay et al.

(10) Patent No.: US 10,801,329 B2
(45) Date of Patent: Oct. 13, 2020

(54) VIBRATION-DAMPING COMPONENTS, GAS TURBINE ENGINE AND METHOD OF FORMING SUCH COMPONENTS

(71) Applicant: General Electric Company, Schenectady, NY (US)

(72) Inventors: Gregory Terrence Garay, West Chester, OH (US); Drew Michael Capps, Avon, IN (US); Yoon Choi, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 204 days.

(21) Appl. No.: 15/816,698

(22) Filed: Nov. 17, 2017

(65) Prior Publication Data
US 2019/0153869 A1    May 23, 2019

(51) Int. Cl.
| | | |
|---|---|---|
| F01D 5/16 | (2006.01) |
| F04D 29/66 | (2006.01) |
| F04D 29/38 | (2006.01) |
| B33Y 80/00 | (2015.01) |
| B29C 64/10 | (2017.01) |

(Continued)

(52) U.S. Cl.
CPC ............... *F01D 5/16* (2013.01); *B22F 3/008* (2013.01); *B22F 3/1055* (2013.01); *B22F 5/009* (2013.01); *B22F 7/08* (2013.01); *B29C 64/00* (2017.08); *B29C 64/10* (2017.08); *B33Y 40/00* (2014.12); *B33Y 80/00* (2014.12); *F01D 5/28* (2013.01); *F04D 29/324* (2013.01); *F04D 29/388* (2013.01); *F04D 29/668* (2013.01); *F23R 3/286* (2013.01); *B29K 2063/00* (2013.01); *B33Y 10/00* (2014.12); *F02C 3/04* (2013.01); *F05D 2220/32* (2013.01); *F05D 2230/237* (2013.01); *F05D 2230/30* (2013.01); *F05D 2230/31* (2013.01); *F05D 2240/35* (2013.01);

(Continued)

(58) Field of Classification Search
None
See application file for complete search history.

(56) References Cited

U.S. PATENT DOCUMENTS

| | | | | |
|---|---|---|---|---|
| 4,706,788 A | * | 11/1987 | Inman | ........................ F16F 7/10 188/268 |
| 6,913,436 B2 | * | 7/2005 | McMillan | ............. F01D 21/045 415/173.4 |

(Continued)

OTHER PUBLICATIONS

Macioce, Paul, "Viscoelastic Damping 101", Roush Industries, Inc., Sep. 2015, 3 pages. https://www.roush.com/wp-content/uploads/2015/09/Insight.pdf.

Primary Examiner — Brian P Wolcott
Assistant Examiner — Jason G Davis
(74) Attorney, Agent, or Firm — Dority & Manning, P.A.

(57) ABSTRACT

A vibration-damping component, a gas turbine engine having the vibration-damping component and a method for forming such component are disclosed. The vibration-damping component comprises a body formed from an additive manufacturing material by an additive manufacturing process and defining a cavity within the body, and a vibration damper disposed within the cavity. The vibration damper comprises a damping element and a damping medium containing a viscoelastic material surrounding the damping element. The damping element has a relative motion when the component vibrates.

13 Claims, 4 Drawing Sheets

(51) Int. Cl.
*B33Y 40/00* (2020.01)
*B22F 3/00* (2006.01)
*F23R 3/28* (2006.01)
*B22F 3/105* (2006.01)
*B29C 64/00* (2017.01)
*B22F 7/08* (2006.01)
*B22F 5/00* (2006.01)
*F01D 5/28* (2006.01)
*B29K 63/00* (2006.01)
*F02C 3/04* (2006.01)
*B33Y 10/00* (2015.01)
*F04D 29/32* (2006.01)

(52) U.S. Cl.
CPC  *F05D 2260/96* (2013.01); *F23R 2900/00014* (2013.01); *F23R 2900/00018* (2013.01)

(56) References Cited

U.S. PATENT DOCUMENTS

| | | |
|---|---|---|
| 7,753,654 B2 | 7/2010 | Read et al. |
| 7,946,035 B2 | 5/2011 | Thompson |
| 8,444,390 B2 | 5/2013 | Read |
| 8,920,893 B2 | 12/2014 | Strother |
| 9,903,434 B2 * | 2/2018 | Erno .................. F16F 9/10 |
| 2013/0294891 A1 | 11/2013 | Neuhaeusler et al. |
| 2015/0052898 A1 | 2/2015 | Erno et al. |

* cited by examiner

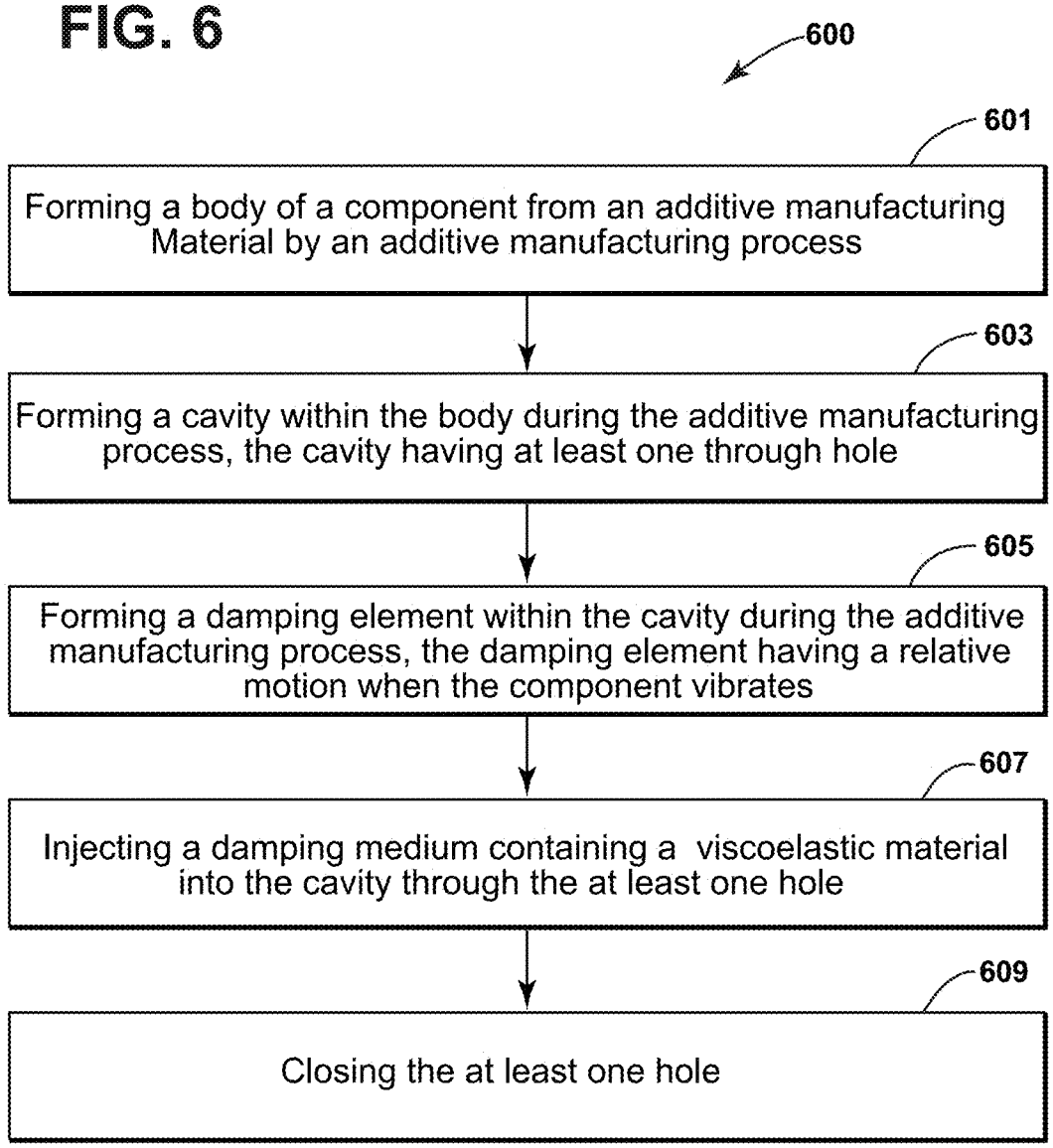

VIBRATION-DAMPING COMPONENTS, GAS TURBINE ENGINE AND METHOD OF FORMING SUCH COMPONENTS

BACKGROUND

This invention relates generally to vibration-damping components, gas turbine engine having the vibration-damping component and methods of forming such components.

Vibration of mechanical components may induce component fatigue and excessive localized noise within mechanical systems. Accordingly, reducing vibrational loading of mechanical components within such mechanical systems is a priority among producers and users of such systems.

Take turbine blades of a gas turbine engine as an example, during engine operation, turbine blades are exposed to a wide variety of stresses due to heat, oscillating airflow, etc. and correspondingly exhibit many adverse vibration modes and manners of operation. As a consequence, large stresses are induced in the blades and other elements of the turbine engine. Thus, damping needs to be introduced to offset these adverse consequences in order to reduce or even eliminate these stresses.

Various attempts have been made to provide damping to such components. For example, in some prior arts, damping materials or dampers have been placed in cavities of the component to reduce or alter vibrational modes. Usually, the dampers may comprise powders, particles, or one or more solidified elements. The solidified element may have various shapes and structures. Furthermore, the solidified element may be free-floating in the cavity or attached to an internal wall of the cavity. As for manufacturing methods of a component with vibration dampers enclosed therein, traditional ways include casting, forging machining, gluing, welding, brazing, or combinations of those methods. For example, it may require the two sides of the component be formed separately and bonded together around a vibration damper. An advanced way is to use an additive manufacturing process to form a component having at least one cavity enclosed and introduce a damper into the cavity during the additive manufacturing process. The additive manufacturing process is more suitable to form a component with complex interior geometries.

However, such known dampers-included cavities incorporated into mechanical components generally do not reduce vibrational loading of such components to a satisfactory level. Accordingly, there remains a need to further improve vibration damping of the mechanical components through placing more effective internal dampers in the cavities of the mechanical components.

BRIEF DESCRIPTION

This need is addressed by the present invention, which provides vibration-damping components, gas turbine engines having the vibration-damping component, and methods of forming such components, which are effective to improve vibration damping performance of the components.

In one aspect, a vibration-damping component is provided. The component comprises a body formed from an additive manufacturing material by an additive manufacturing process and defining a cavity within the body, and a vibration damper disposed within the cavity. The vibration damper comprises a damping element which has a relative motion when the component vibrates, and a damping medium containing a viscoelastic material surrounding the damping element.

In another aspect, a gas turbine engine is provided. The gas turbine engine includes a combustor assembly, a turbine assembly, and a compressor assembly. The combustor assembly includes a plurality of fuel mixers. The turbine assembly includes a plurality of turbine blades. The compressor assembly includes a plurality of fan blades. At least one of fuel mixers, turbine blades, and fan blades comprises a vibration-damping component. The vibration-damping component comprises a body formed from an additive manufacturing material by an additive manufacturing process and defining a cavity within the body, and a vibration damper disposed within the cavity. The vibration damper comprises a damping element which has a relative motion when the component vibrates, and a damping medium containing a viscoelastic material surrounding the damping element.

In yet another aspect, a method of forming a vibration-damping component is provided. The method comprises forming a body of the component from an additive manufacturing material by an additive manufacturing process; forming a cavity within the body during the additive manufacturing process, the cavity having at least one through hole; forming a damping element within the cavity during the additive manufacturing process; injecting a damping medium containing a viscoelastic material into the cavity through the at least one through hole; and closing the at least one through hole. The damping element has a relative motion when the component vibrates.

BRIEF DESCRIPTION OF THE DRAWINGS

The invention may be best understood by reference to the following description taken in conjunction with the accompanying drawing figures in which:

FIG. 6 is a flowchart of an exemplary method of forming a vibration-damping component with an aspect of the present invention.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION OF THE INVENTION

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Figure 1:
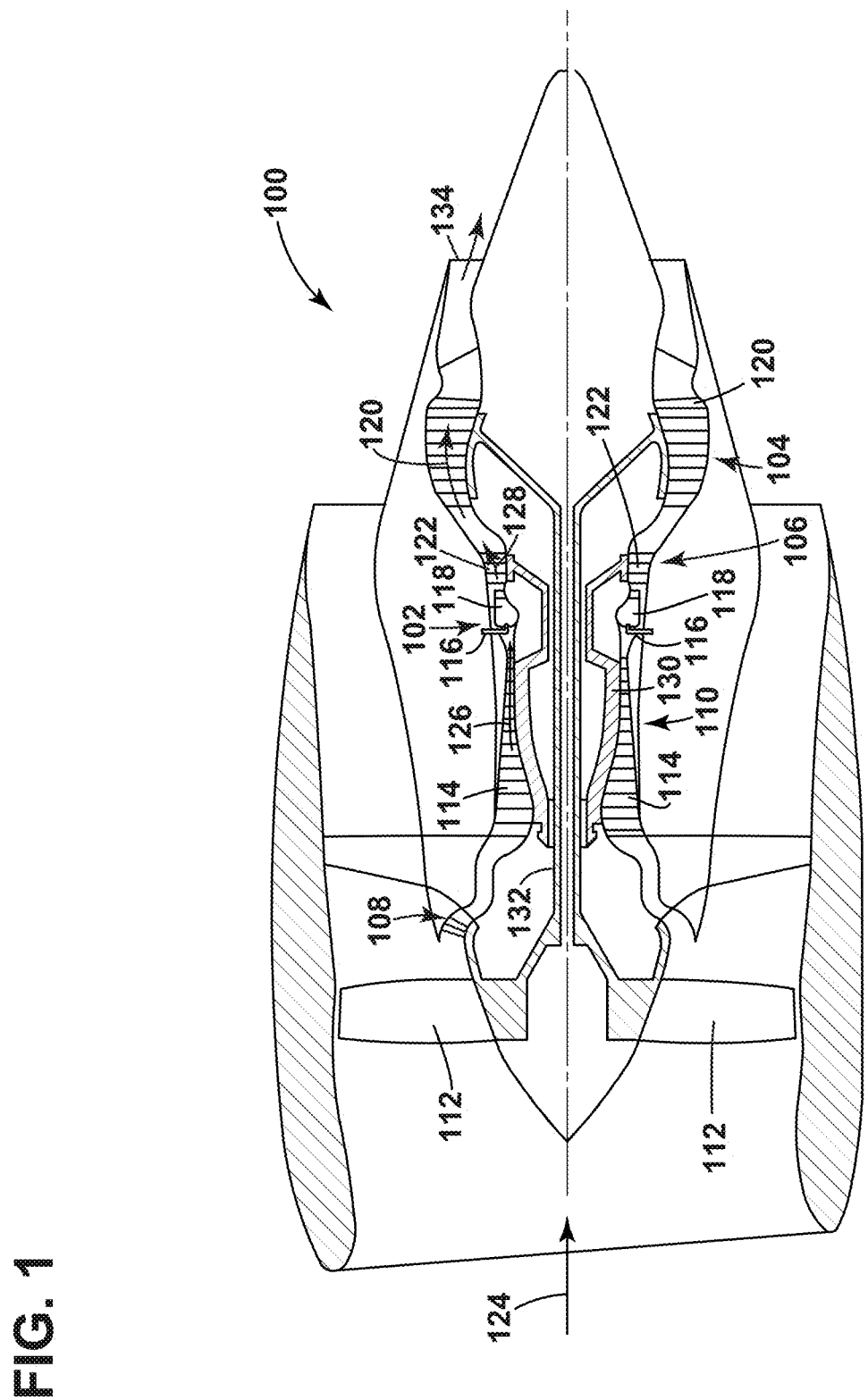
FIG. 1 is a schematic illustration of an exemplary gas turbine engine.

FIG. 1 is a schematic illustration of an exemplary gas turbine engine, indicated generally at 100. In the exemplary embodiment, the gas turbine engine 100 includes a combustor assembly 102, a low-pressure turbine assembly 104, and a high-pressure turbine assembly 106, collectively referred to as a turbine assembly. The gas turbine engine 100 also includes a fan 112, a low-pressure compressor assembly 108 and a high-pressure compressor assembly 110, generally referred to as a compressor assembly. In the exemplary embodiment, the gas turbine engine 100 is an aircraft engine, although in alternative embodiments, gas turbine engine 100 may be any other suitable gas turbine engine, such as an electric power generation gas turbine engine or a land-based gas turbine engine.

Low-pressure compressor assembly 108 and high-pressure compressor assembly 110 each include a plurality of fan blades respectively, for compressing ambient air flowing into gas turbine engine 100. Combustor assembly 102 includes a plurality of fuel mixers 116 for mixing fuel with pressurized air and/or injecting fuel or an air/fuel mixture into a combustion chamber 118. Low-pressure turbine assembly 104 and high-pressure turbine assembly 106 each include a plurality of turbine blades 120 and 122, respectively.

In operation, ambient air, represented by arrow 124, enters gas turbine engine 100 and is pressurized by low-pressure compressor assembly 108 and/or high-pressure compressor assembly 110. Pressurized air, represented by arrow 126, is mixed with fuel via fuel mixers 116, and combusted within combustion chamber 118, producing high-energy combustion products, represented by arrow 128. Combustion products 128 flow from combustion chamber 118 to high-pressure turbine assembly 106 and drive high-pressure compressor assembly 110 via a first drive shaft 130. Combustion products 128 then flow to low-pressure turbine assembly 104 and drive low-pressure compressor assembly 108 via a second drive shaft 132. Combustion products 128 exit gas turbine engine 100 through an exhaust nozzle 134, and provide at least a portion of the jet propulsive thrust of the gas turbine engine 100.

The components of gas turbine engine 100 may be subjected to vibrational forces during operation, resulting in part from rotation of compressor assemblies 108 and 110 and turbine assemblies 104 and 106, and the combustion of gases within gas turbine engine 100.

Figure 2:
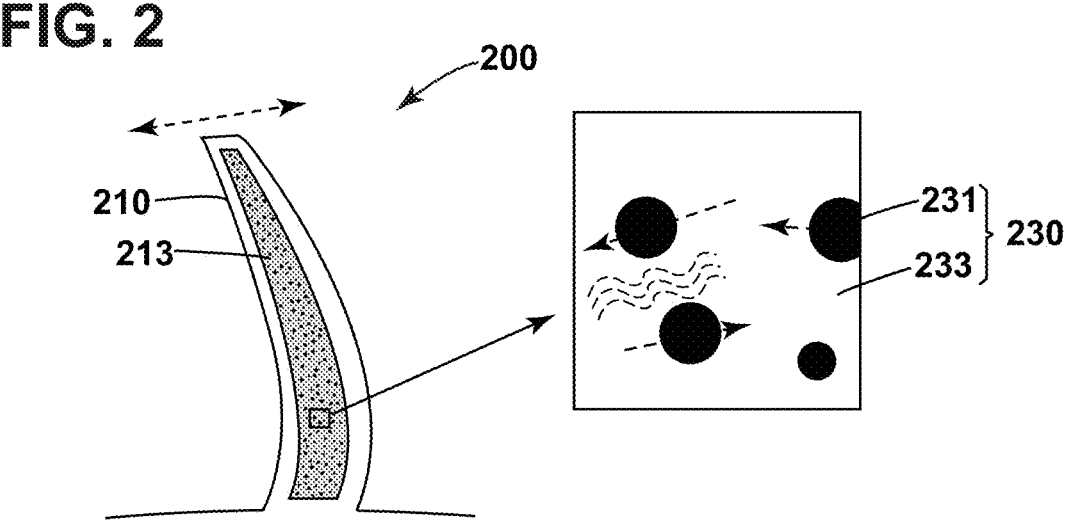
FIG. 2 is a schematic illustration of an exemplary vibration-damping component in accordance with a first embodiment of the present invention.

FIG. 2 is a schematic illustration of an exemplary vibration-damping component 200 in accordance with a first embodiment of the present invention. In the illustrated embodiment, component 200 is a turbine blade 120 of gas turbine engine 100 shown in FIG. 1, in particular, a hollow turbine blade, although in alternative embodiments, component 200 may be any other component of gas turbine engine 100, such as fan blades 112 and 114 or fuel mixer 116. In yet further alternative embodiments, component 200 may be a component other than a component of a gas turbine engine 100.

Component 200 comprises a body 210 formed from an additive manufacturing material by an additive manufacturing process and defining a cavity 213 within the body. The additive manufacturing process (also known as rapid prototyping, rapid manufacturing, and 3D printing) comprises selective laser sintering (SLS) process, direct metal laser sintering (DMLS), electron beam melting (EBM), selective heat sintering (SHS), stereolithography (SLA), or any other suitable additive manufacturing process. Component 200 may be fabricated from any suitable additive manufacturing material, such as metal powder(s) (e.g., cobalt chrome, steels, aluminum, titanium and/or nickel alloys), gas atomized metal powder(s), thermoplastic powder(s) (e.g., polylactic acid (PLA), acrylonitrile butadiene styrene (ABS), and/or high-density polyethylene (HDPE)), photopolymer resin(s) (e.g., UV-curable photopolymers), thermoset resin(s), thermoplastic resin(s), or any other suitable material that enables component 200 to function as described herein. As used herein, the term "additive manufacturing material" includes any materials that may be used to fabricate a component by an additive manufacturing process, such as these additive manufacturing processes described above.

In some embodiments, component 200 may comprise more than one cavities 213 defined within the body 210 of component 200. Component 200 may comprise any suitable number of cavities 213 that enables component 200 to function as described herein. Each cavity 213 is enclosed within the body 210 of component 200 and may have any suitable shape that enables component 200 to function as described herein. In the exemplary embodiment shown in FIG. 2, component 200 has only one cavity 213 and the cavity 213 has a similar shape as the shape of the body 210.

The cavity 213 includes a vibration damper 230 enclosed therein. The vibration damper 230 comprises a plurality of powders or particles 231 and a damping medium 233 containing a viscoelastic material surrounding the powders or particles 231. The viscoelastic material exhibits viscoelasticity. Viscoelasticity is a property of a solid or liquid which, when deformed, exhibits both viscos and elastic behavior through the simultaneous dissipation and storage of mechanical energy. The viscoelastic material as used herein, is a name given to a class of materials that displays a stretching or elongation response usually referred to as a strain to an external stress that is dependent on the initial stress, on the strain, and on either the time rate of application of the stress or the time rate of change of the strain. The viscoelastic material acts as a strain-based damper and damps the vibrations of component 200 by removing energy from the vibrations due to its viscoelasticity. Any suitable viscoelastic material may be used as the damping medium, such as an epoxy resin, polyurethane or other suitable polymer. For example, some typical viscoelastic materials which can be used for internal damping of a component include adhesive films, such as 3M 507FL, 3M AF191, and MSC 104 manufactured by 3M Bonding Systems. Usually the viscoelastic material is flowable at an elevated temperature. The damping medium 233 containing a flowable viscoelastic material may be injected into cavity 213 after the cavity 213 is almost formed.

As shown in FIG. 2, powders or particles 231 are suspended in damping medium 233 containing the viscoelastic material. In the exemplary embodiment, powders or particles 231 usually have a particle size in a range of 5-1000 microns, preferably in a range of 10-500 microns. Since the body 210 of component 200 is fabricated by an additive manufacturing process, the powders or particles 231 may be introduced into the cavity 213 during the additive manufacturing process. The composition of powders or particles 231 may be selected from metal, ceramic, thermoplastic, or a combination thereof. In one embodiment, the powders or particles 231 comprise a part of unsolidified additive manufacturing material used for fabricating the body 210. Thus, a part of the unsolidified additive manufacturing material is selectively left in the cavity 213 during the additive manufacturing process. In alternative embodiments, the powders or particles 231 may comprise a material other than the additive manufacturing material used for fabricating component 200. In addition, the powders or particles 231 may have any suitable shapes, such as spherical, cylindrical, cubic, acicular, and flakey.

As shown in FIG. 2, as component 200 vibrates, the powders or particles 231 have a relative motion, which may induce shear into the damping medium 233 containing a viscoelastic material and results in more dissipation of energy.

Figure 3:
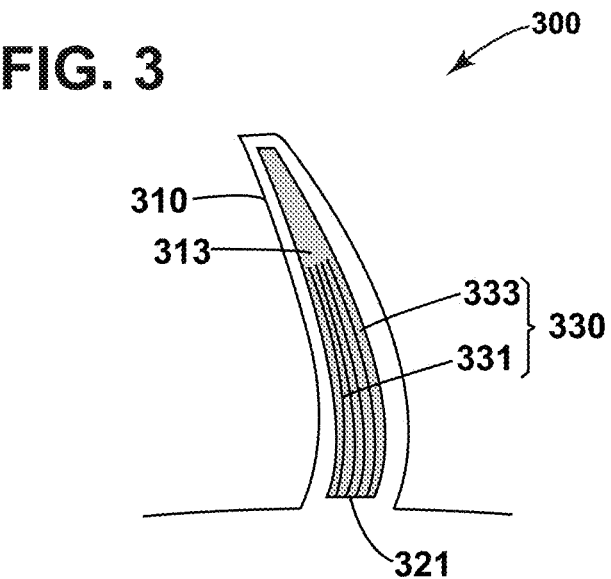
FIG. 3 is a schematic illustration of an exemplary vibration-damping component in accordance with a second embodiment of the present invention.
Figure 4:
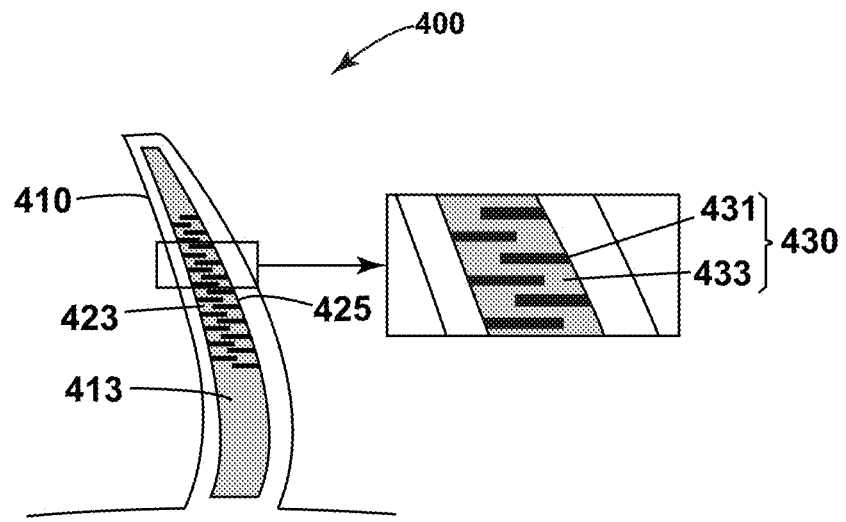
FIG. 4 is a schematic illustration of an exemplary vibration-damping component in accordance with a third embodiment of the present invention.
Figure 5:
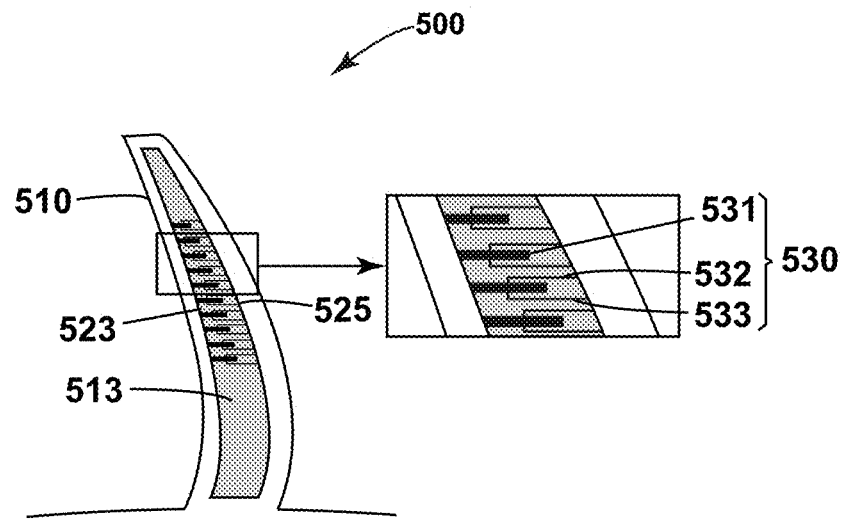
FIG. 5 is a schematic illustration of an exemplary vibration-damping component in accordance with a fourth embodiment of the present invention.

FIGS. 3-5 are schematic illustration of exemplary vibration-damping components 300, 400, and 500 in according with a second, a third and a fourth embodiment of the present invention respectively. Each of vibration-damping components 300, 400, and 500 is substantially identical to component 200 (shown in FIG. 2) having a body with a cavity and a damping medium containing a viscoelastic material within the cavity, with the exception that at least one solidified element is positioned in the cavity to replace power or particles 231 as the damping element. Each of the solidified elements has a first end coupled to an inner wall of the cavity and a second end cantilevered. The solidified elements may have various geometries, including rod, flat-plate, hollow tube, or any suitable geometries. When component 300, 400, and 500 vibrates, the solidified element inside its cavity has a relative motion, which induces shear into the damping medium containing a viscoelastic material, and results in more dissipation of energy.

As shown in FIG. 3, component 300 comprises a body 310 defining a cavity 313 within the body. The cavity 313 includes a vibration damper 330 enclosed therein. The vibration damper 330 comprises a solidified element including multiple long rods 331 as the damping element and a damping medium 333 containing a viscoelastic material surrounding the multiple long rods 331. Each of the multiple long rods 331 has one end coupled to an inner wall 321 of the cavity, and a second end cantilevered. In the exemplary embodiment, the multiple long rods 331 extend in a same direction substantially, so they are almost parallel to each other. In alternative embodiments, the multiple long rods 331 may extend in different directions. Furthermore, each of the multiple long rods 331 may have any suitable cross-sections, such as circular, oval, square, rectangular, and triangle, that enables the vibration damper 330 to function as described herein.

In the exemplary embodiment, the multiple long rods 331 are formed by the same additive manufacturing process used to fabricate the body 310 of component 300. Thus, the multiple long rods 331 may be fabricated from the same additive manufacturing material used to fabricate the body 310. In alternative embodiments, the multiple long rods 331 may be fabricated from a material other than the additive manufacturing material used to fabricate the body 310.

As shown in FIG. 4, component 400 comprises a body 410 formed from an additive manufacturing material by an additive manufacturing process and defining a cavity 413 within the body. The cavity 413 includes a vibration damper 430 enclosed therein. The vibration damper 430 comprises a solidified damping element including multiple short rods 431 and a damping medium 433 containing a viscoelastic material surrounding the multiple short rods 431. In particular, a part of the multiple short rods 431 are attached to a first internal side wall 423 of the cavity 413, and the other part of the multiple short rods 431 are attached to a second internal side wall 425 facing to the first internal side wall 423 of the cavity 413. The two parts of the multiple short rods 431 at least partially intersect. Thus, an interwoven structure is formed by the multiple short rods 431.

In the exemplary embodiment, the multiple rods 431 are formed by the same additive manufacturing process used to fabricate the body 410 of component 400. Thus, the multiple rods 431 may be fabricated from the same additive manufacturing material used to fabricate the body 410. In alternative embodiments, the multiple rods 431 may be fabricated from a material other than the additive manufacturing material used to fabricate the body 410.

As shown in FIG. 5, component 500 comprises a body 510 formed from an additive manufacturing material by an additive manufacturing process and defining a cavity 513 within the body. The cavity 513 includes a vibration damper 530 enclosed therein. The vibration damper 530 comprises two kinds of solidified damping elements and a damping medium 533 containing a viscoelastic material surrounding the solidified elements. One kind of the solidified elements are short rods 531 attached to a first internal side wall 523 of the cavity 513. The other kind of the solidified elements are hollow tubes 532 attached to a second internal side wall 525 of the cavity 513 facing to the first internal side wall 523 of the cavity 513. At least one short rod 531 is at least partially inserted into one of the hollow tubes 532. The damping medium containing a viscoelastic material surrounds the short rods 531 and both inside and outside of the hollow tubes 532.

In the exemplary embodiment, the short rods 531 and the hollow tubes 532 are formed by the same additive manufacturing process used to fabricate the body 510 of component 500. Thus, the short rods 531 and the hollow tubes 532 may be fabricated from the same additive manufacturing material used to fabricate the body 510. In alternative embodiments, the short rods 531 and the hollow tubes 532 may be fabricated from a material other than the additive manufacturing material used to fabricate the body 510. In addition, the short rods 531 and the hollow tubes 532 may be fabricated from two different materials.

In the above described embodiments, the damping element and the damping medium occupy at least 50% of the volume enclosed by the cavity. More particularly, 50% to 100% of the volume enclosed by the cavity is filled with the damping element and the damping medium.

FIG. 6 is a flowchart of an exemplary method 600 of forming a vibration-damping component by an additive manufacturing process. In the method 600, damping elements are advantageously formed in-situ during the additive manufacturing process used to fabricate the component. The method 600 comprises a step 601 of forming a body of the component from an additive manufacturing material by an additive manufacturing process; a step 603 of forming a cavity within the body during the additive manufacturing process, the cavity having at least one through hole connecting the cavity and an outside space of the component; a step 605 of forming a damping element within the cavity during the additive manufacturing process, the damping element having a relative motion when the component vibrates; a step 607 of injecting a damping medium containing a viscoelastic material into the cavity through the at least one through hole; and a step 609 of closing the at least one through hole. The steps 601, 603, 605 may performed simultaneously because they all happen during the additive manufacturing process.

In some embodiments, in step 603, a cavity having a first through hole and a second through hole may be formed within the body of the component. In step 607, the damping medium containing a viscoelastic material is injected into the cavity through the first through hole. The second through hole is to let air out during the injection. In step 609, both the first and the second through holes are closed.

In some embodiments, the step 605 of forming a damping element within the cavity comprises introducing a damping element, such as powder or particles, into the cavity. Unsolidified additive manufacturing material used to fabricate the body of the component may be enclosed within the cavity to act as the damping element by leaving the unsolidified manufacturing material within the cavity. Alternatively, other materials may be enclosed within the cavity to act as the damping element by adding other materials to the cavity before the cavity is completely formed, or enclosed.

In alternative embodiments, the step 605 of forming a damping element within the cavity may comprise selectively solidifying additive manufacturing materials used to fabricate the body of the component to obtain a solidified element and enclosing the solidified element within the cavity. The additive manufacturing materials for forming the solidified element may be same as the additive manufacturing materials used for fabricating the component, or may be other material different from the additive manufacturing materials used for fabricating the component.

The step 609 of closing the at least one through hole may be completed by welding, brazing. In some embodiments, the at least one through hole may be closed using epoxy.

The above described components and methods enable use of a vibration damper within one or more cavities formed in components, which includes a damping element and a damping medium containing a viscoelastic material surrounding the damping element. The combination of a damping element and a damping medium containing a viscoelastic material could improve vibration damping performance of components. The vibration dampers may be precisely formed and strategically positioned within the components so as to not compromise the structural integrity of the component. Further, through use of additive manufacturing technology, the components and methods described herein enable efficient manufacture and greatly reduce the amount of time and costs needed to fabricate vibration-damping components. When the component vibrates, the relative motion of the damping element induces shear into the damping medium containing a viscoelastic material causing more dissipation of energy. Therefore, in contrast to known articles and methods of manufacturing such articles, the components and methods described herein facilitate fabrication of vibration-damping components, and provide improved damping performance over known articles.

The above described components and methods could be used in various industries, not limited to gas turbine engine, such as wind turbine components and any other long slender components having vibration damping needs. The components and method of this disclosure can also be used in construction industry, for example, some components of bridge and skyscraper.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A vibration-damping component, comprising:
   a body formed from an additive manufacturing material by an additive manufacturing process and defining a cavity within the body; and
   a vibration damper disposed within the cavity and comprising:
      a damping-material having a relative motion when the component vibrates; and
      a damping medium containing a viscoelastic material surrounding the damping material,
   wherein the body is formed of solidified portions of the additive manufacturing material, and
   wherein the damping material is formed of unsolidified portions of the additive manufacturing material.

2. The vibration-damping component of claim 1, wherein the additive manufacturing material comprises at least one of a metal powder, a thermoplastic powder, a photopolymer resin, a thermoset resin, and a thermoplastic resin.

3. The vibration-damping component of claim 1, wherein the damping material comprises powders or particles suspended in the viscoelastic material.

4. The vibration-damping component of claim 3, wherein the powders or particles have particle size in a range of 5-1000 microns.

5. The vibration-damping component of claim 1, wherein the damping material is formed of unsolidified portions of the additive manufacturing material used to form the body of the component left inside the cavity during the additive manufacturing process.

6. The vibration-damping component of claim 3, wherein the powders or particles are introduced into the cavity during the additive manufacturing process.

7. The vibration-damping component of claim 1, wherein the viscoelastic material comprises epoxy resin or polyurethane.

8. A gas turbine engine comprising:
   a combustor assembly including a plurality of fuel mixers;
   a turbine assembly including a plurality of turbine blades; and
   a compressor assembly including a plurality of fan blades,
   wherein at least one of the fuel mixers, the turbine blades, and the fan blades comprises the component according to claim 1.

9. A method of forming a vibration-damping component, comprising:
   forming a body of the component from an additive manufacturing material by an additive manufacturing process;

forming a cavity within the body during the additive manufacturing process, the cavity having at least one through hole;

forming a damping material within the cavity during the additive manufacturing process, the damping material having a relative motion when the component vibrates;

injecting a damping medium containing a viscoelastic material into the cavity through the at least one through hole; and closing the at least one through hole, wherein the body is formed of solidified portions of the additive manufacturing material, and wherein the damping material is formed of unsolidified portions of the additive manufacturing material.

10. The method of claim 9, wherein the at least one through hole is closed by welding or brazing.

11. The method of claim 9, wherein the at least one through hole is closed using epoxy.

12. The method of claim 9, wherein forming the damping material comprises introducing powders or particles into the cavity.

13. The method of claim 9, wherein forming the damping material comprises leaving the unsolidified portions of the additive manufacturing material used to form the body of the component in the cavity.

\* \* \* \* \*